United States Patent
Belsky et al.

(10) Patent No.: US 10,685,154 B2
(45) Date of Patent: Jun. 16, 2020

(54) ANALYTICAL CONSISTENT SENSITIVITIES FOR NONLINEAR EQUILIBRIUMS, WHERE THE ONLY SOURCE OF NONLINEARITIES IS SMALL SLIDING CONTACT CONSTRAINTS

(71) Applicant: Dassault Systemes Simulia Corp., Johnston, RI (US)

(72) Inventors: Vladimir Belsky, Johnston, RI (US); Claus Bech Wittendorf Pedersen, Hamburg (DE); Michael Wood, Johnston, RI (US)

(73) Assignee: DASSAULT SYSTEMES SIMULIA CORP., Johnston, RI (US)

( * ) Notice: Subject to any disclaimer, the term of this patent is extended or adjusted under 35 U.S.C. 154(b) by 696 days.

(21) Appl. No.: 15/393,830

(22) Filed: Dec. 29, 2016

(65) Prior Publication Data

US 2018/0189433 A1    Jul. 5, 2018

(51) Int. Cl.
*G06F 30/23*        (2020.01)
*G06F 111/10*       (2020.01)

(52) U.S. Cl.
CPC .......... *G06F 30/23* (2020.01); *G06F 2111/10* (2020.01)

(58) Field of Classification Search
CPC .................... G06F 17/5018; G06F 2217/16
See application file for complete search history.

(56) References Cited

U.S. PATENT DOCUMENTS

2016/0098499 A1 *  4/2016  Heirman ............... G06F 30/20
                                                              703/2

OTHER PUBLICATIONS

"Load cases" Fusion 360 Help, Autodesk [retrieved on Aug. 2, 2019]. Retrieved from <http://help.autodesk.com/view/fusion360/ENU/?guid=GUID-80CD570A-7BED-4BBD-8DDA-534AB692BC8C> (Year: 2019).*
Floudas et al. "Encyclopedia of Optimization" 2nd Edition, p. 409 [retrieved on Aug. 1, 2019]. Retrieved from <https://rd.springer.com/referencework/10.1007%2F978-0-387-74759-0> (Year: 2009).*
Cline et al. "Post-Stabilization for Rigid Body Simulation with Contact and Constraints" Proceedings of tho 2003 IEEE Internstionat Conference on Robotics & Automation Taipei, Taiwan, pp. 3744-3751 [retrieved on Aug. 1, 2019]. Retrieved from <http://ieeexplore.ieee.org/docurnent/1242171> (Year: 2003).*

(Continued)

*Primary Examiner* — Rehana Perveen
*Assistant Examiner* — Alfred H B Wechselberger
(74) *Attorney, Agent, or Firm* — Armstrong Teasdale LLP

(57) ABSTRACT

Provided are a computer-based method and system of simulating a physical real-world system. Such a method begins by defining, in memory of a processor, a model comprising a plurality of design variables where the defined model represents a real-world physical system and where behavior of the model is given by an equation stored in the memory. The method/system uses the equation to iteratively optimize the defined model with respect to a given one of the plurality of design variables by simultaneously solving for equilibrium of the model and for the design response sensitivity of the given design variable, for the equilibrium, in a given optimization iteration. According to such an embodiment, iteratively optimizing the model results in an improved simulation of the real-world physical system.

15 Claims, 5 Drawing Sheets

(56) References Cited

OTHER PUBLICATIONS

"Abaqus Analysis User's Manual" [online documentation] Version 6.10, Dassault System [retrieved on Jul. 23, 2019], various sections. Retrieved from <https://www.sharcnet.ca/Software/Abaqus610/Documentation/docs/v6.10/books/usb/default.htm> (Year: 2010).*
Ryu et al. "Structural Design Sensitivity Analysis of Nonlinear Response" Computers and Structures, vol. 21, No. 1/2, pp. 245-255 [retrieved on Jul. 23, 2019]. Retrieved from <https://www.sciencedirect.com/science/article/pii/0045794985902470> (Year: 1985).*
Son et al. "Hybrid Dynamic Simulation of Rigid-Body Contact with Coulomb Friction" Proceedings of the 2001 IEEE International Conference on Robotics & Automation Seoul, Korea, pp. 1376-1381 [retrieved on Aug. 1, 2018]. Retrieved from <https://parasol.tamu.edu/publications/download.php?file_id=82> (Year: 2001).*
"Abaqus Theory Manual" [online documentation] Version 6.10, Dassault System [retrieved on Jul. 23, 2019], various sections. Retrieved from <https://www.sharcnet.ca/Software/Abaqus610/Documentation/docs/v6.10/books/stm/default.htm> (Year: 2010).*
Chakmakov, G. "Optimization techniques with SIMULIA Tosca" SIMULIA Seminar, Apr. 2016 [retrieved on Jul. 24, 2019]. Retrieved from <http://meet.cadcam-group.eu/pdf/SIMULIAseminar_April2016/Georgi_Chakmakov_Tosca_Optimization_techniques.pdf> (Year: 2016).*
"Embed", [website] Oxford English Dictionary [retrieved on Feb. 14, 2020]. Retrieved from <https://www.oed.com/view/Entry/60835?redirectedFrom=embed#eid> (Year: 2020).*
"Embedded", [website] Oxford English Dictionary [retrieved on Feb. 14, 2020]. Retrieved from <https://www.oed.com/view/Entry/242718?rskey=D3rWK0&result=2&isAdvanced=false#eid> (Year: 2020).*
"Embedded", [website] Wolfram MathWorld [retrieved on Feb. 14, 2020]. Retrieved from <http://mathworld.wolfram.com/search/?query=embedded&x=0&y=0> (Year: 2020).*
"Embed", [website] Wolfram MathWorld [retrieved on Feb. 14, 2020]. Retrieved from <http://mathworld.wolfram.com/search/?query=embedded&x=0&y=0> (Year: 2020).*
Brotcorne et al. "Bilevel Programming: The Montreal School" INFOR, vol. 46, No. 4, pp. 231-246; DOI: 10.3138/infor.46.4.231 [retrieved on Apr. 27, 2020]. Retrieved from <http://citeseerx.ist.psu.edu/viewdoc/download?doi=10.1.1.626.2993&rep=rep1&type=pdf> (Year: 2008).*
Bendsøe, M.P. and Sigmund, O., "Topology Optimization—Theory, Methods and Applications," (2004).
Choi, K. K. and Kim, N. H, *Structural Sensitivity Analysis and Optimization 1: Linear Systems*, Springer-Verlag New York Inc. (2005).
Choi, K. K. and Kim, N. H, *Structural Sensitivity Analysis and Optimization 2: Nonlinear Systems and Applications*, Springer-Verlag New York Inc. (2005).
Fancello, E.A., "Topology Optimization for Minimum Mass Design Considering Local Failure Constraints and Contact Boundary Conditions", *Structural and Multidisciplinary Optimization*, 32:229-240. (2006).
Giusti, et al., "Topology Design of Elastic Structures for a Contact Model," *Lecture Notes in Computational Science and Engineering*, 101:203-220 (2014).
Hilding, D. and Klarbring, A., "Optimization of structures in frictional contact," *Comput. Methods Appl. Mech. Engrg.*, 205-208:83-90 (2012).
Kleiber, M., et al., *Parameter Sensitivity in Nonlinear Mechanics, Theory and Finite Element Computations*, John Wiley and Sons. (1997).
Michaleris, P., et al., "Tangent Operators and Design Sensitivity Formulations for Transient Non-linear Coupled Problems with Applications to Elastoplasticity," *International Journal for Numerical Methods in Engineering*, 37:2471-2499 (1994).
Stromberg, N. and Klarbring A., "Topology optimization of structures in unilateral contact," *Structural and Multidisciplinary Optimization*, 41: 57-64 (2010).
Tortorelli, D. A. and Michaleris, P., "Design sensitivity analysis: Overview and review," *Inverse Problems in Engineering*, 1:71-105 (1994).
Van Keulen, F.,et al., "Review of Options for Structural Design Sensitivity Analysis. Part 1: Linear Systems," *Computer Methods in Applied Mechanics and Engineering*, 194:3213-3243 (2005).
Vidal, C. A. and Haber, R. B. "Design Sensitivity Analysis for Rate-independent Elastoplasticity," *Computer Methods in Applied Mechanics and Engineering*, 107:393-431 (1993).

* cited by examiner

ANALYTICAL CONSISTENT SENSITIVITIES FOR NONLINEAR EQUILIBRIUMS, WHERE THE ONLY SOURCE OF NONLINEARITIES IS SMALL SLIDING CONTACT CONSTRAINTS

BACKGROUND

Embodiments of the invention generally relate to the field of computer programs and systems, and specifically to the field of computer aided design (CAD), computer-aided engineering (CAE), modeling, simulation, and optimization.

A number of systems and programs are offered on the market for the design of parts or assemblies of parts. These so called CAD systems allow a user to construct and manipulate complex three-dimensional models of objects or assemblies of objects. CAD systems thus provide a representation of modeled objects using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element model (FEM). The terms finite element analysis (FEA) model, FEM, finite element mesh, and mesh are used interchangeably herein. A FEM typically represents a CAD model, and thus, may represent one or more parts or an entire assembly. A FEM is a system of points called nodes which are interconnected to make a grid, referred to as a mesh.

The FEM may be programmed in such a way that the FEM has the properties of the underlying object or objects that it represents. When a FEM, or other such CAD or CAE model is programmed in such a way, it may be used to perform simulations of the object that the model represents. For example, a FEM may be used to represent the interior cavity of a vehicle, the acoustic fluid surrounding a structure, and any number of real-world objects and systems. When a given model represents an object and is programmed accordingly, it may be used to simulate the real-world object itself. For example, a FEM representing a stent may be used to simulate the use of the stent in a real-life medical setting.

Likewise, CAD, CAE, and FEM models may be used to improve the design of the objects that the models represent. These design improvements may be identified through use of optimization techniques that run a series of simulations in order to identify changes to the design of the model and thus, the underlying object that the model represents.

SUMMARY OF THE INVENTION

While methods exist for optimization and simulation, these existing methods can benefit from functionality improving their computational efficiency and thus, embodiments of the present invention provide improvements to automated product design methods and systems based upon optimization and simulation.

One such example embodiment provides a computer-implemented method of simulating a physical system that begins by defining, in memory of a processor, a model comprising a plurality of design variables. In this example, the defined model represents a real-world physical system and behavior of the model is given by an equation stored in the memory. Such an example embodiment continues by using the equation to iteratively optimize the model with respect to a given one of the plurality of design variables by simultaneously solving for equilibrium of the model and design response sensitivity of the given design variable for the equilibrium in a given optimization iteration. In this example embodiment, the iterative optimizing results in an improved simulation of the real-world physical system. In this way, embodiments enhance CAD systems, CAE systems, and the like that employ or otherwise utilize embodiments and results thereof.

According to one such example embodiment of the method, the iterative optimizing includes optimizing the behavior of the model having an element in contact with one or more surface. In such example embodiment, the behavior of the model may be non-linear. In an embodiment of the method where the behavior of the model is non-linear, this non-linear behavior may include small sliding contact constraints which are capable of being modeled by a linear complementarity problem (LCP).

In yet another method embodiment, the iterative optimizing includes solving for the equilibrium of the model using linear complementarity problems. According to an alternative embodiment, solving for the design response sensitivity of the given design variable is embedded in solving for the equilibrium of the model using the LCP. Further, in yet another embodiment, the model is iteratively optimized with respect to a plurality of the design variables.

Moreover, according to a further embodiment of the method, the design variable is at least one of: a thickness, a width, a radius, a composite material angle, a sizing variable, a material interpolation variable for topology, a shape variable, and a bead variable. Further still, in yet another embodiment, iteratively optimizing the model optimizes at least one of the following types of model responses: a structural, a computational fluid dynamics (CFD), a thermo-mechanical, an electromechanical, an electromagnetic, an acoustic, and a fluid-structural response of the model.

An embodiment of the present invention is directed to a computer system for simulating a physical system. An example embodiment of the computer system comprises a processor and a memory with computer code instructions stored thereon, where the processor and the memory, with the computer code instructions are configured to cause the system to define, in the memory, a model comprising a plurality of design variables, where the defined model represents a real-world physical system and where behavior of the model is given by an equation stored in the memory. In such a system embodiment, the processor and the memory, with the computer code instructions, are further configured to cause the system to iteratively optimize the model with respect to a given one of the plurality of design variables by simultaneously solving for equilibrium of the model and design response sensitivity of the given design variable for the equilibrium in a given optimization iteration. According to the system embodiment, iteratively optimizing the model results in an improved simulation of the real-world physical system in CAD systems, CAE systems, and the like that employ the invention system.

In another embodiment of the system the iterative optimizing includes optimizing the behavior of the model in contact with one or more surface. According to such an embodiment, this behavior may be non-linear. Further, according to an embodiment, the nonlinear behavior includes small sliding contact constraints which can be modeled by a LCP. According to yet another embodiment, the iterative optimizing includes solving for the equilibrium of the model using linear complementarity problems. In an alternative embodiment of the system, solving for the design response sensitivity of the given design variable is embedded in solving for the equilibrium of the model using the LCP. Further still, in yet another embodiment, the model is iteratively optimized with respect to a plurality of the design variables.

According to a system embodiment, iteratively optimizing the model optimizes at least one of: a structural, a CFD, a thermo-mechanical, an electro-mechanical, an electromagnetic, an acoustic, and a fluid-structural response of the model. Further, according to another system embodiment, the design variable is at least one of: a thickness, a width, a radius, a composite material angle, a sizing variable, a material interpolation variable for topology, a shape variable, and a bead variable.

Yet another embodiment of the present invention is directed to a cloud computing implementation for simulating a physical system. Such an embodiment is directed to a computer program product executed by a server, in communication across a network, with one or more clients. In such an embodiment, the computer program product comprises a computer readable medium that embodies or otherwise comprises program instructions, which, when executed by a processor, causes the processor to define, in memory of the processor, a model comprising a plurality of design variables, the defined model representing a real-world physical system where behavior of the model is given by an equation stored in the memory. Further still, in such a cloud computing environment, the program instructions, when executed, further cause the processor to iteratively optimize the model with respect to a given one of the plurality of design variables by simultaneously solving for equilibrium of the model and design response sensitivity of the given design variable for the equilibrium in a given optimization iteration. In this way, cloud computing implementations of the present invention enhance CAD systems, CAE systems, and the like employing embodiments and optimized results thereof. According to yet another cloud computing embodiment, iteratively optimizing the model includes solving for equilibrium of the model using LCPs and further, embedding solving for the design response sensitivity of the given design variable in solving for the equilibrium of the model using the LCPs.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
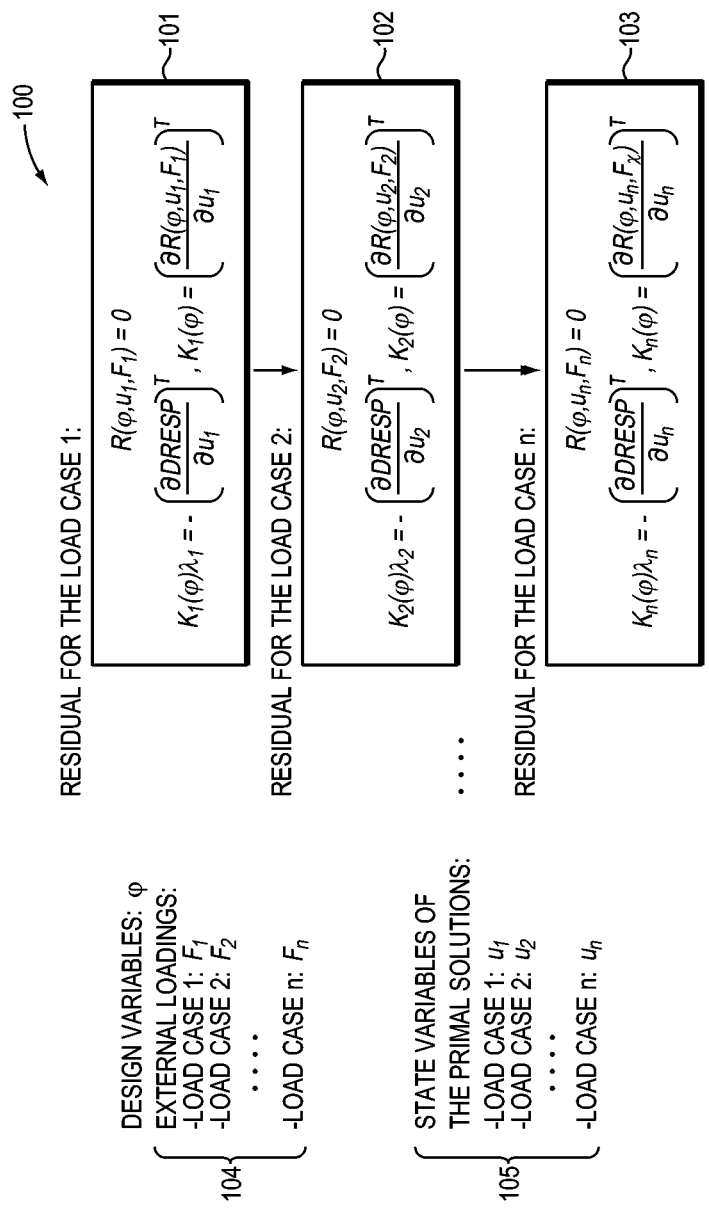
FIG. 1 is a flowchart of a method that optimizes a model.

A description of example embodiments of the invention follows.

The teachings of all patents, published applications and references cited herein are incorporated by reference in their entirety.

The term "sensitivities" is used herein, however, it is noted that sensitivities are mathematically equivalent to derivatives, and the term sensitivities is commonly used in structural and multidisciplinary optimization.

As described herein, embodiments of the present invention provide methods and systems for simulating and optimizing systems and models of systems, e.g. CAD and CAE models of physical systems. Recently, design processes, such as optimization, have transformed from being a process of trial and error into a more modern process that includes utilizing simulation early in the design process and further, utilizing automated optimization. Frequently, automated optimization methods use analytical or semi-analytical sensitivities. Further, in general, the equilibrium equations used during optimization, which govern behavior of systems, e.g., mechanical systems, are non-linear. In addition, the typical optimization programs include multiple equilibrium equations corresponding to several load cases. In operation, these equilibrium equations are combined into a system of equality constraints in a given optimization problem. According to the adjoint optimization approach, a set of adjoint variables corresponding to all equilibrium equations is computed in addition to the prime solutions.

Under certain circumstances, simulations and optimizations can be performed that trade formulation complexity for turnaround time so as to get fast answers to design questions without compromising robustness or reliability. Examples of such scenarios occur where the only source of nonlinearity is small sliding contact (between a model element and a subject surface). In the small sliding contact formulation, such as the contacts that can be simulated using principles described herein, the formulation assumes that the contacting surfaces undergo small sliding relative to each other, but arbitrary rotation of the bodies is permitted. Small-sliding contact is computationally less expensive than finite-sliding contact. In the contrary, a finite-sliding formulation is used to model the interaction between deformable bodies or an arbitrarily shaped rigid body where separation and sliding of finite amplitude and arbitrary rotation of the surfaces may arise. Thereby, both formulations allow bodies to undergo large motions but the limitation in the small sliding is the assumption that the sliding of the surfaces in contact is relatively small. Existing methods, such as the "Severe Discontinuity Iteration" (SDI) approach utilized in Abaqus® is a general purpose techniques for solving equilibrium equations that accounts for all sources of nonlinearities and not just those resulting from small-sliding contact. However, in such an example, the SDI technique is overly conservative and leads to a computationally expensive method.

To improve performance, methods have begun using specialized algorithms for solving "Linear Complementarity Problems" (LCP) when solving equilibrium equations involving small sliding contact. The so-called LCP technique can be employed to solve the contact inequality constraints. The LCP technique can be used to complement existing methods, such as the SDI approach and can be used for optimization and simulation that includes small-sliding contact with linear material behavior and small displacements as well as small rotations.

Thus, while the LCP technique can be used to complement existing methods, methods and systems are needed to make this methodology more computationally efficient. For instance, an improved method for calculating the variables of the adjoint solutions for cases where the LCP technology is used to determine the prime solutions would be beneficial. Such techniques have the potential to be particularly advantageous in the automotive and aerospace industries where sensitivity based optimization is used extensively for structural parts and assemblies of parts with the only non-linear modeling being small sliding contact. In such cases, using efficiently computed analytical or semi-analytical sensitivities significantly influences the ability to have fast optimization turnaround times for generative designing and thereby, improving the overall design process.

Calculating analytically consistent adjoint solutions is an essential part of the adjoint method for solving optimization problems with several objectives and constraints. In cases where the number of constraints in an optimization problem is large and/or the number of load cases is high, it is particularly important to efficiently compute many adjoint solutions. In a general case, when the constraints are represented by systems of non-linear equilibrium equations corresponding to multiple loading conditions, the traditional workflow involves determining variables of the adjoint solutions. FIG. 1 illustrates an example traditional workflow 100. In the workflow 100, for each load case 104 the system of nonlinear equilibrium equations is solved to determine the corresponding primary variables 105. In turn, the stiffness matrix and the adjoint pseudoload vector corresponding to the primary solution are computed. The stiffness matrix operator $K_i(\varphi)$ and the adjoint pseudoload vector $\partial DRESP/\partial u_i$ are computed as the derivatives of the residual vector and the design response with respect to the primal solution for each load case "i" (101). In turn, the variables adjoint solutions are determined for the sensitivities as the solution of the linear system of equations. For the case where the stiffness matrix operator is not symmetric, then the transposed stiffness matrix operator is used as a global operator matrix for computing the variables of the adjoint solutions. This process is then repeated for each load case (102-103).

Thus, in the workflow 100 for determining analytically consistent adjoint variables for sensitivities used in an optimization process, if one assumes the number of load cases 104 is N, the workflow 100 requires solving N systems of nonlinear equilibrium equations, formulating N stiffness matrices and adjoint pseudoload vectors corresponding to the primal solutions for each load case 104, and solving N linear systems of equations for obtaining the adjoint variables where the matrices are different for each load case.

In existing methods, such as those described in: (1) Fancello, E. A., Topology Optimization of Minimum Mass Design Considering Local Failure Constraints and Contact Boundary Conditions, Structural and Multidisciplinary Optimization, 32: 229-240 (2006); (2) Strömberg N. and Klarbring A., Topology optimization of structures in unilateral contact, Structural and Multidisciplinary Optimization, 41: 57-64 (2010); (3) Giusti S. M., Sokolowski J. and Stebel J., Topology Design of Elastic Structures for a Contact Model, Lecture Notes in Computational Science and Engineering, 101: 203-220 (2014); (4) Kleiber, M., Antunez, H., Hien, T. D. and Kowalczyk, P., Parameter Sensitivity in Nonlinear Mechanics, Theory and Finite Element Computations, John Wiley and Sons (1997); (5) Michaleris, P., Tortorelli, D. A. and Vidal, C. A., Tangent Operators and Design Sensitivity Formulations for Transient Non-linear Coupled Problems with Applications to Elastoplasticity, International Journal for Numerical Methods in Engineering 37: 2471-2499 (1994); and (6) Choi, K. K. and Kim, N. H, Structural Sensitivity Analysis and Optimization 1: Linear Systems, Springer-Verlag New York Inc. (2005); the contents of which are herein incorporated by reference, the equilibrium is traditionally determined using a classic iterative scheme, such as Newton Raphsons, to solve simultaneously for both the displacement and contact pressure of the system using a global operator which is often referred to as the assembled consistent stiffness matrix. Consequently, in these existing methods, for each load case, a fully iterative process has to be completed where each load case has a different global operator. Afterwards, the adjoint sensitivities for each load case are obtained using each specific global stiffness matrix operator at the converged primal solutions for each load case. Embodiments of the present invention are fundamentally different than these existing methods because, amongst other reasons, embodiments of the present invention use only one global operator for the displacements for obtaining the primal solutions of all load cases, and additionally, only one global operator for the displacements is utilized to obtain the adjoint sensitivities. Such functionality greatly improves the computational efficiency of the optimization/simulation methods and systems implemented according to the principles described herein.

Existing methods do not provide efficient functionality for determining analytical or semi-analytical sensitivities that leverage linear complementarity problems to formulate non-linear equilibrium conditions for multiple load cases.

Embodiments of the present invention overcome the aforementioned deficiencies and can be used to implement improved methods of optimization and simulation in a variety of fields including structural optimization disciplines such as topology optimization, shape optimization, sizing optimization, and bead optimization. In structural mechanics embodiments of the present invention, LCPs are used to model equilibriums conditions in which the only source of nonlinearity is small sliding contact. Further, embodiments of the present invention are not limited to structural optimization disciplines and can be used in a variety of fields where the physical constraints in an optimization method can be represented by LCPs, such as multiphysics optimizations including computational fluid dynamics (CFD), thermo-mechanical, electro-mechanical, and fluid-structure. By leveraging the principles of the present invention, optimization methods with sensitivities as input for the mathematical programming, i.e., the optimization solvers, provide optimization functionality for a variety of disciplines where the sensitivities are both numerically and mathematically sensible.

As noted hereinabove, embodiments of the present invention can be used to optimize systems where constraints can be represented by LCPs. In such embodiments, the sensitivity calculations are imbedded inside the solver of the linear complementarity problems for the cases of multiple loading conditions. By tightly incorporating sensitivity calculations inside the LCP solver, embodiments efficiently utilize all of the LCP computation machinery to compute the adjoint variables while incurring limited additional computational costs. In such an example embodiment, there are two possible scenarios. In the first, the adjoint pseudoload vectors ∂DRESP/∂$u_i$ are independent of the solutions $u_i$ for all load cases "i." In such a case, embodiments provide highly computationally efficient methods and systems for calculation of the adjoint variables for optimization problems by introducing a novel process in which computing of the adjoint variables is an integrated part of (and is tightly intertwined with) the solution of LCPs for multiple load cases. In the second scenario, adjoint pseudoload vectors ∂DRESP/∂$u_i$ depend on the solution $u_i$ for some or all load cases "i." In such a scenario, embodiments likewise provide computationally efficient methods and systems for optimization problems by introducing a novel process in which computing of the adjoint variables is performed immediately after the solutions for multiple LCP problems is determined (thereby the computing of the adjoint pseudoload vectors ∂DRESP/∂$u_i$ is possible), using saved multiple factorized matrices of active LCP constraints corresponding to each load case.

Embodiments of the present invention provide several advantages for computing sensitivities based upon variables for the adjoint solutions compared to existing solutions for computing adjoint solutions. For instance, the computational resources required to compute adjoint variables in embodiments of the present invention are negligible in comparison to traditional methods of solving of the LCP problems with multiple load cases. Such efficiency results by eliminating the need to compute and save multiple global stiffness matrices for each LCP solution (set of active contact constraints) for each load case; eliminating the need of subsequent factorization of global stiffness matrixes and performing forward passes for the adjoint pseudoload vectors corresponding to each LCP solution for each load case; and eliminating the need of subsequent backward passes to find the variables for the adjoint solutions corresponding to each LCP solution for each load case.

Embodiments of the present invention provide methods and systems for automated product design based upon optimization and simulation. Embodiments of the present invention perform these optimizations and simulations utilizing models, e.g., CAD, CAE, and finite element models. Methods exist for simulating variations of parameters of these models, which are often referred to as sensitivity simulations. Such simulation and optimization methods can identify and determine, for example, behavior of the model for different values for parameter values. In the case of optimization, optimal values for these parameters can be determined through performance of optimization methods, i.e., mathematical programming, that include sensitivity simulations. However, methods do not exist for analytical or semi-analytical sensitivity solutions which take advantage of the fact that the nonlinear equilibrium conditions from multiple load cases can be formulated as a linear complementarity problem and thus, existing methods do not provide functionality to calculate analytically or semi-analytically consistent adjoint solutions as required by adjoint methods.

Figure 2:
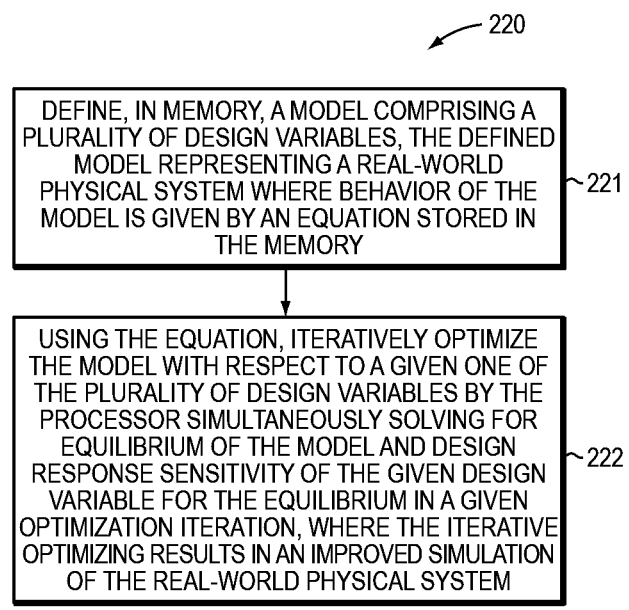
FIG. 2 is a flowchart of method of simulating a physical system according to principles of an embodiment.

FIG. 2 depicts one such example method 220 that simulates/optimizes a physical system by utilizing Applicant's approach that leverages the fact that nonlinear equilibrium conditions from multiple load cases can be formulated as a linear complementarity problem. The method 220 begins at step 221 by defining, in memory, a model comprising a plurality of design variables. In the method 220, the model defined at step 221 represents a real-world physical system and behavior of the model is given by an equation stored in the memory. Thus, defining the model at step 221 may further include defining the equation and terms of the equation such that the equation, for example, if solved, can yield a result that describes behavior of the model. For instance, in an example embodiment where the physical system is a plane, the equation could describe the flight of the plane under various operating conditions, such as the speed and elevation that the plane could achieve with various design parameters and the stresses and forces on the plane under those conditions. As is known to those of skill in the art, defining the model 221 may include defining these operating conditions so as to facilitate the method 220 simulating/optimizing the model of the plane under the operating conditions of interest.

According to an embodiment of the method 220, the model may be defined at step 221 according to any method known in the art. Further, while described as representing a real-world physical system, the method 220 is not so limited, and the defined model may represent any system, whether real or contemplated (e.g., hypothetical), where determining an optimized design of the system is desired. Example systems include, vehicles, buildings, medical devices, sports equipment, airplanes, military weapons, etc. In an embodiment, the model may be any computer based model, e.g. a CAD model or finite element model, known in the art. Likewise, the design variables may be any design variables that are associated with the physical system that the model represents. Example design variables include, but are not limited to: a dimension, a thickness, a width, a radius, a composite material angle, a sizing variable, a material interpolation variable for topology, a shape variable, and a bead variable.

At step 221, according to a computer implemented embodiment of the method 220, the memory is any memory communicatively coupled, or capable of being communicatively coupled, to the computing device performing the method 220. Likewise, the processor is any processor known in the art and may also include any number of processors in a distributed computing arrangement.

To illustrate the step 221, consider a simplified example where a suspension bridge is being designed and the method 220 is used to simulate/optimize the design of the bridge. At step 221, a finite element model is defined, and stored in memory, that reflects all of the properties of the bridge, e.g., the dimensions, materials, etc. and the defined model includes several design variables, e.g., cable length and cable thickness. Further, the behavior of the bridge is governed by an equation, known in the art; and defining the model at step 221 may include defining parameters of the equation. It is understood that one or more equations, a set of equations, or a system of equations may govern the behavior of the bridge, but is stated in the singular (an equation) herein for simplicity.

The method 220 continues at step 222 by the processor, iteratively optimizing the model defined at step 221, with respect to a given one of the plurality of design variables using the equation. The iterative optimizing at step 222 includes the processor simultaneously solving for equilibrium of the model and for design response sensitivity of the given design variable for the equilibriums in a given optimization iteration. In an embodiment of the method 220, simultaneously solving for equilibrium of the model and design response sensitivity of the given design variable leverages LCPs by solving for the equilibrium of the model using LCPs. In such an embodiment, the design response sensitivity may be simultaneously solved with the equilibrium by embedding solving for the design response sensitivity of the design variable in the solving for the equilibrium of the model using the LCPs. According to an embodiment, the iterative optimizing at step 222 may be performed using mathematical programming, e.g., optimization computations, techniques, and methods that are known in the art, that are modified so as to simultaneously solve for equilibrium of the model and design response sensitivity of the given design variable for the equilibrium as described herein. In mathematics, computer science and operations research, mathematical programming is alternatively referred to as mathematical optimization or simply optimization. The mathematical programming may be a process of selecting a best solution (with regard to some criterion) from some set of available alternatives. Many, and often the most efficient, mathematical programming methods are based on the design response sensitivities of the design variables. Thus, embodiments may utilize an existing software suite for performing optimization but modify the methodology so as to conform to the methods and systems described herein.

Step 222 efficiently iteratively optimizes the model defined at step 221 by simultaneously solving for equilibrium of the model and design response sensitivity of the given design variable. As is known in the art, optimization methods are performed iteratively, i.e., small changes are made to a model for a given iteration, and it is determined whether behavior of the model complies with desired specifications. For the method 220, at step 222, in a given iteration, behavior of the model is determined in steps, where at various steps equilibrium is reached. Unlike existing methods that separately solve for equilibrium of the model and design response sensitivity of a design variable, embodiments of the present invention provide an improved optimization methodology by simultaneously solving for both the equilibrium of the model and design response sensitivity. As described herein, at step 222, the method 220 solves for the equilibrium and the design response sensitivity of the design variable for the equilibrium. Further, as is known in the art, a given optimization iteration may include solving for a plurality of equilibriums and in such an alternative embodiment, the design response sensitivity of the given variable is determined for each equilibrium of the optimization iteration.

In an example embodiment, the method 220 is not limited to optimizing the model with respect to a single design variable, and in such an embodiment, the method 220 may optimize the model with regard to a plurality of design variables. In such an embodiment, at step 222, the design response sensitivity of each design variable is simultaneously determined along with the equilibrium of the model.

According to an embodiment of the method 220, optimizing the model at step 222 includes modifying the model based upon the determined design response sensitivity of the subject design variable. For instance, in an example, the determined design response sensitivity may indicate that increasing the value of the subject design variable would allow the model to move closer to achieving desired performance and thus, the optimization would modify the design variable as such when performing the iterative optimization at step 222. Thus, such a modification may include modifying the subject design variable in a direction indicated by the determined design response sensitivity. Likewise, the iterative optimizing at step 222 may determine a parameter value for the subject design variable.

To illustrate step 222, consider the aforementioned bridge example, where the design variable of interest is cable thickness. In the example embodiment of the method 220, it is desired to optimize cable thickness (i.e., minimize) while still allowing the bridge to conform to a load requirement. In such an example, the bridge model defined at step 221 is used in an iterative optimization, where in a given iteration, the bridge is experiencing a first load and is at a first equilibrium. The method 220 is used to optimize the model of the bridge under these conditions. To perform this optimization, where for example cable thickness is minimized, the bridge model is iteratively optimized, e.g., the equation of the bridge is used in mathematical programming to determine a minimum cable thickness for the load requirement where the design response sensitivity of the cable thickness and equilibrium of the bridge is solved simultaneously.

According to an embodiment of the method 220, the model defined at step 221 may be used in an iterative optimization at step 222 to optimize any behavior of the model. For instance, the method 220 may optimize at least one of: a structural, a computational fluid dynamics (CFD), a thermo-mechanical, an electro-mechanical, an electromagnetic, an acoustic, and a fluid-structural response of the model.

In an example embodiment of the method 220, optimizing the model at step 222 includes optimizing the behavior of the model having an element in contact with one or more surfaces. In yet another embodiment, the method 220 includes optimizing non-linear behavior of the model when the model (element thereof) contacts a surface. Further still, according to an alternative embodiment, the method 220, at step 222, optimizes nonlinear behavior of the model that includes small sliding contact constraints which can be modeled by a LCP.

Figure 3:
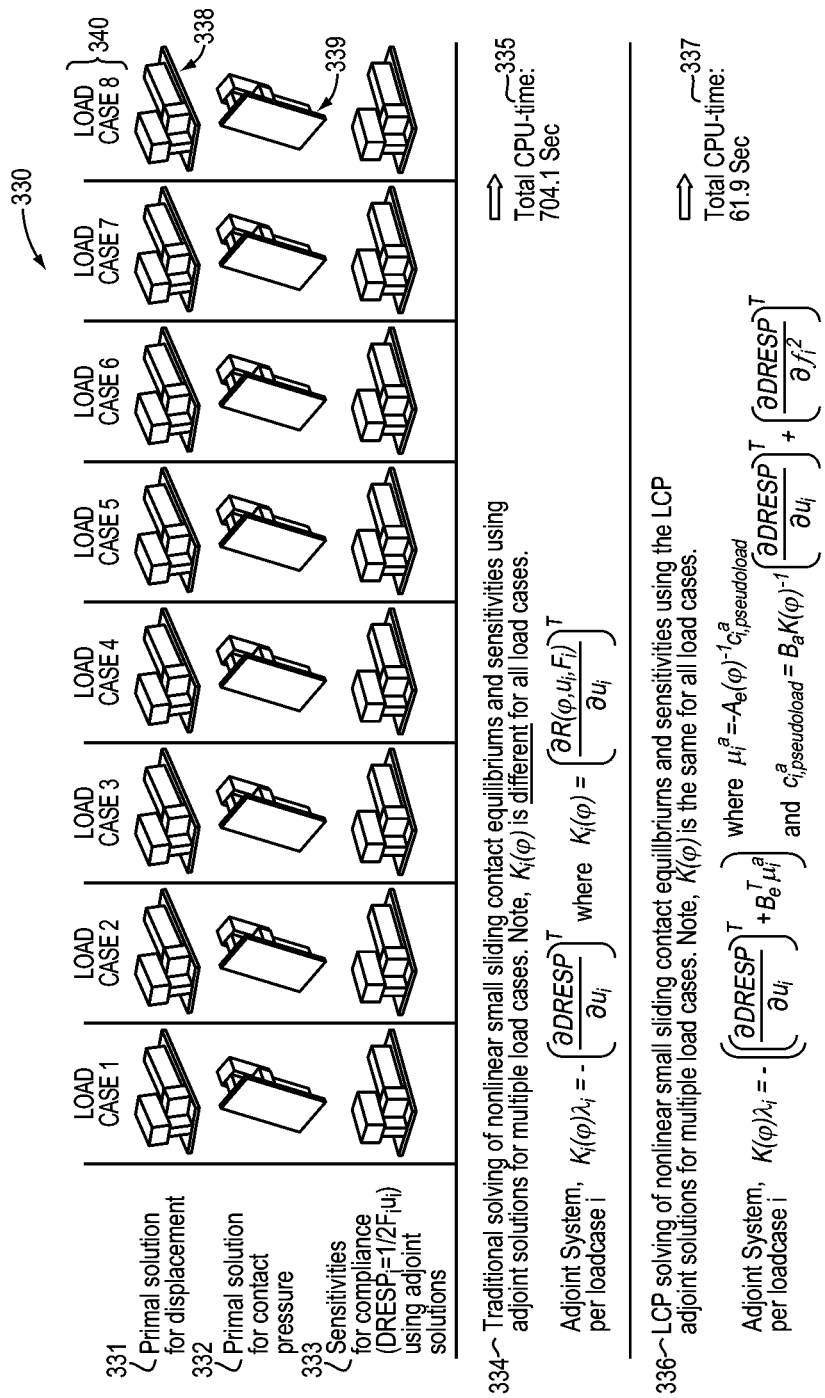
FIG. 3 illustrates an example simulation performed according to principles of an embodiment.

FIG. 3 illustrates an example implementation 330 of the principles of the present invention. The implementation 330 illustrates a practical example for topology sensitivities where the elemental design variables are defined using the Solid Isotropic Material and Penalization (SIMP) approach in, for non-limiting example, a CAD system, CAE system, or the like. In the example of FIG. 3, the model 338 is linear except for the bottom surface of the model 338 being in contact with a rigid plate 339 simulated using linear small sliding contact. Additionally, the bolts used to connect the model 338 to the plate 339 are modeled using connector elements. For reference, the CPU-time numbers 335 and 337 shown in FIG. 3 were determined using a single CPU on an Intel® Xeon® CPU X550 at 2.67 GHz 24.0 Gb RAM.

FIG. 3 demonstrates the eight various load cases 340 each having different deformation for the primal solutions 331 and thereby, different contact scenarios with different contact pressure distributions 332. Additionally, in the example implementation 330, the adjoint sensitivities for compliance (=½·'external loads'·'displacements') 333 corresponding to the individual design response (DRESP) of all eight load cases 340 are also computed. At 333, $F_i$ is the external loads vector of a load case i, and $U_i$ is the displacement vector of the load case i. In the implementation 330, the total CPU-times 335 and 337 for solving for both the primal solutions 331 and 332 and the adjoint solutions 333 for the sensitivities are calculated using the traditional Newton Raphsons approach 334 and an LCP solver approach 336 according to the principles described herein. As shown in FIG. 3, a significant speed up 337 is observed for the LCP solver approach 336 for both the solving of the primal solutions 331 and 332 and the solving of the adjoint solutions 333 for obtaining the sensitivities. Thus, by implementing the principles of the present invention, the CPU time is significantly reduced from 704.1 seconds to 61.9 seconds.

Hereinbelow, another example embodiment is described. In relation to this first example embodiment, a formulation of a contact problem with multiple load cases is defined in which the only source of nonlinearity is frictionless small sliding contact. Second, a description of the computational procedure based on the LCP for contact forces is described, and thirdly, computations of the variables for the adjoint solutions of the sensitivities within the framework of the LCP for the primal variables for the case of multiple loads are provided. It is noted that while in the preceding description, the only source of nonlinearity is frictionless small sliding contact, embodiments of the present invention are not limited to such a requirement and can be used in an optimization/simulation where the contact constraints are any contact constraints that can be modeled by a linear complementarity problem.

The formulation of the contact problem with multiple load cases where the only source of nonlinearity is frictionless small sliding contact is given by $$E_i^{total} = \tfrac{1}{2} u_i^T K(\varphi) u_i - u_i^T F_i \Rightarrow \min,$$

$$r(u_i) = B u_i + r_0 \geq 0,$$

where $u_i$ is a vector of displacements corresponding to the loading vector $F_i$ defined on the finite element space; i is the load case number; $K(\varphi)$ is a stiffness matrix as a function of design variables $\varphi$ defined on the finite element space; $r(u_i)$ is a contact clearance; the contact is "closed" if $r(u_i)=0$ and is "opened" if $r(u_i)>0$; B is the matrix that defines the contact constraints; and $r_0$ is the initial clearance between the model element and the subject surface. The displacements can be eliminated by introducing an unknown vector of contact forces $f_i$ which are Lagrange multipliers corresponding to the contact inequality constraints $Bu_i + r_0 \geq 0$: $u_i = K(\varphi)^{-1}(F_i + B^T f_i)$, subject to the following conditions, $f_i \geq 0$ and $f_i^T (Bu_i + r_0) = 0$. In this example embodiment, the formulation is a classical formulation of the Linear Complementarity Problem (LCP). After elimination of the displacements, the final formulation of the contact problem with the only source of nonlinearity being frictionless small sliding contact can be written for each load case $F_i$ as a LCP problem with respect to the contact forces $f_i$ only:

$$A(\varphi) f_i + c_i(\varphi) \geq 0, f_i \geq 0, f_i^T (A(\varphi) f_i + c_i(\varphi)) = 0.$$

where $A(\varphi) = B K(\varphi)^{-1} B^T, c_i(\varphi) = B K(\varphi)^{-1} F_i + r_0$ For solving the above formulation, where $A(\varphi)$ is a positive-definite matrix, there are several computational methods for solving the LCP problem that can be used in embodiments of the invention. In the instant example embodiment, for the given set of design variables $\varphi$, for each load case, the set of "active" contact constraints will be unique. The "active" contact constraints are determined by the LCP solver. "Active" constraints are those constraints for which contact is closed (clearance is equal to zero) and the corresponding contact pressure is positive:

$$(A(\varphi) f_i + c_i(\varphi))^a = 0, f_i^a > 0.$$

For the "passive" contact constraints which comprise the complementary set to the "active" constraints, the contact pressure is equal to zero:

$$(A(\varphi) f_i + c_i(\varphi))^p = 0, f_i^p = 0.$$

In such an embodiment, to solve the LCP problems, a square symmetric positive definite submatrix $A_a(\varphi)$ of the global matrix $A(\varphi)$ is introduced that corresponds to the "active" (positive) contact pressure degrees of freedom only. This is an "active set" submatrix of the matrix $A(\varphi)$. In this case the following equation for the active contact pressures can be written:

$$A_a(\varphi) f_i^a = -c_i^a(\varphi) \text{ or } f_i^a = -A_a^{-1}(\varphi) c_i^a(\varphi).$$

Further, any conventional computational procedure for solution of the LCP problems generates an active set. In addition, it typically provides an access to the inverse active set matrix $A_a^{-1}(\varphi)$ in some form, direct inverse, Cholesky decomposition $A_a(\varphi) = L_a(\varphi) L_a^T(\varphi)$, ($L_a(\varphi)$ is a lower triangular matrix, amongst others.

The example embodiment continues with computation of sensitivities of design responses (DRESPs) using variables of adjoint solutions in case of the LCP problems for contact forces in frictionless small sliding contact with multiple load cases. The design response DRESP and the Lagrange multipliers are given by:

$$\text{DRESP} = \text{DRESP} + \lambda_i^T (K(\varphi) u_i - F_i - B^T f_i) + \mu_i^T (B u_i + r_0)$$

where $\lambda_i$ are Lagrange multipliers corresponding to the equilibrium equation for $u_i$ (adjoint variables); $\mu_i$ are Lagrange multipliers corresponding to the contact inequality constraints $Bu_i + r_0 \geq 0$; summation over the load cases "i" in the above equation is assumed.

Further, in regards to such an implementation, it is noted that $$\mu_i = \begin{bmatrix} \mu_i^a \\ \mu_i^p = 0 \end{bmatrix},$$

which corresponds to:

$$Bu_i + r_0 = \begin{bmatrix} (Bu_i + r_0)^a = 0 \\ (Bu_i + r_0)^p > 0 \end{bmatrix}$$

The derivative of the design response DRESP with respect to design variables $\varphi$ is given by:

$$\frac{d\text{DRESP}}{d\varphi} = \frac{\partial \text{DRESP}}{\partial \varphi} + \frac{\partial \text{DRESP}}{\partial F_i} \frac{dF_i}{d\varphi} +$$

$$\frac{\partial \text{DRESP}}{\partial u_i} \frac{du_i}{d\varphi} + \frac{\partial \text{DRESP}}{\partial f_i^a} \frac{df_i^a}{d\varphi} + \frac{\partial \text{DRESP}}{\partial r_0} \frac{dr_0}{d\varphi} +$$

$$\lambda_i^T \left( \frac{\partial K(\varphi)}{\partial \varphi} u_i + K(\varphi) \frac{du_i}{d\varphi} - \frac{dF_i}{d\varphi} - B_a^T \frac{df_i^a}{d\varphi} \right) + (\mu_i^a)^T \left( B_a \frac{du_i}{d\varphi} + \frac{dr_0}{d\varphi} \right),$$

where $$\frac{du_i}{d\varphi}$$

is eliminated by enforcing:

$$\left( \frac{\partial \text{DRESP}}{\partial u_i} + \lambda_i^T K(\varphi) + (\mu_i^a)^T B_a \right) \frac{du_i}{d\varphi} =$$

$$0 \Rightarrow K(\varphi) \lambda_i = - \left( \left( \frac{\partial \text{DRESP}}{\partial u_i} \right)^T + B_a^T \mu_i^a \right),$$

where $$\frac{df_i^a}{d\varphi}$$

is eliminated by enforcing:

$$\left(\frac{\partial DRESP}{\partial f_i^a} - \lambda_i^T B_a^T\right)\frac{df_i^a}{d\varphi} = 0 \Rightarrow B_a\lambda_i - \left(\frac{\partial DRESP}{\partial f_i^a}\right)^T = 0.$$

In determining the foregoing derivative, $$K(\varphi)\lambda_i = -\left(\left(\frac{\partial DRESP}{\partial u_i}\right)^T + B_a^T \mu_i^a\right)$$

the first pseudoload is equivalent to external load and the first adjoint system is equivalent to the system for displacements using global stiffness operators.

To continue, $\lambda_i$ is eliminated from the first equation and substituted into the second equation, yielding:

$$B_a K(\varphi)^{-1} B_a^T \mu_i^a + B_a K(\varphi)^{-1}\left(\frac{\partial DRESP}{\partial u_i}\right)^T + \left(\frac{\partial DRESP}{\partial f_i^a}\right)^T = 0$$

Then $c_i^a$ is defined as:

$$c_{i,pseudoload}^a = B_a K(\varphi)^{-1}\left(\frac{\partial DRESP}{\partial u_i}\right)^T + \left(\frac{\partial DRESP}{\partial f_i^a}\right)^T$$

where $$\mu_i^a = -A_a(\varphi)^{-1} c_{i,pseudoload}^a.$$

Here, $$\left(\frac{\partial DRESP}{\partial u_i}\right)^T$$

is the first pseudoload and is equivalent to external load;

$$\left(\frac{\partial DRESP}{\partial f_i^a}\right)^T$$

is the second pseudoload and is equivalent to contact clearance; and $\mu_i^a = -A_a(\varphi)^{-1} c_{i,pseudoload}^a$ is the second adjoint system and is equivalent to solving for active contact pressure.

This yields the below final equation for the derivative of the design response sensitivities with respect to the design variable $\varphi$:

$$\frac{dDRESP}{d\varphi} = \frac{\partial DRESP}{\partial \varphi} + \frac{\partial DRESP}{\partial F_i}\frac{dF_i}{d\varphi} + \frac{\partial DRESP}{\partial r_0}\frac{dr_0}{d\varphi} + \lambda_i^T\left(\frac{\partial K(\varphi)}{\partial \varphi}u_i - \frac{dF_i}{d\varphi}\right) + (\mu_i^a)^T\frac{dr_0}{d\varphi}.$$

This derivative can then be used in optimization/simulation solving methods, e.g., the method 220 at step 222, to simultaneously solve for equilibrium of the model and design response sensitivity. According to an embodiment, simultaneously solving for equilibrium of the model and design response sensitivity is possible due to the equivalence of the representations for the inverse active set matrices $A_a^{-1}(\varphi)$ defined for the contact pressure $f_i$ (which determines equilibrium of the model) and for the Lagrange multipliers corresponding to the contact inequality constraints $\mu_i$ (which determines design response sensitivity).

As described herein, embodiments of the present invention provide a procedure to compute adjoint variables corresponding to the LCP-based equilibrium equations rigorously and consistently in the sensitivity equations. Such functionality, according to an embodiment, can be considered a combined computational procedure to determine primal and adjoint variables. Unlike existing methods, embodiments provide methods that tightly integrate the necessary computational ingredients to compute primal and adjoint variables into a single computational procedure, both in theoretical and numerical implementations. According to an embodiment, no additional standalone computational stage is required to determine the variables for the adjoint solutions after computing the primal variables. Such embodiments of the present invention provide greatly improved computationally efficiency in, for non-limiting example, model simulations of CAD systems, CAE systems, and the like.

Figure 4:
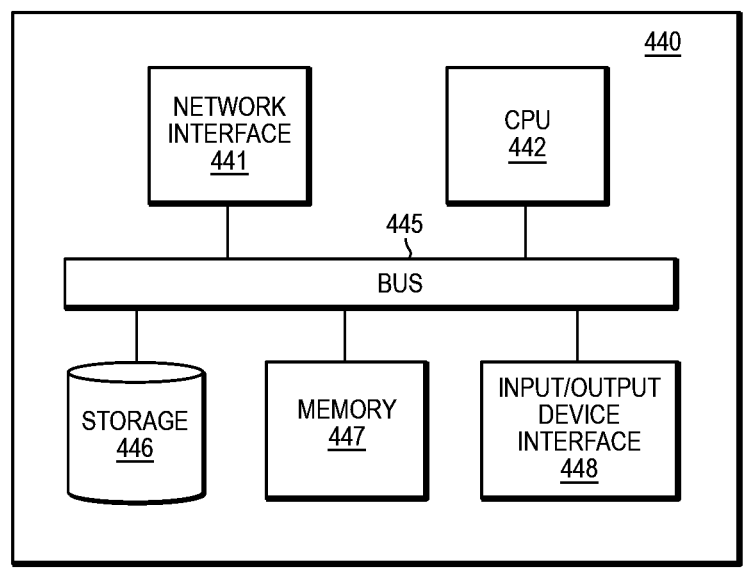
FIG. 4 is a simplified block diagram of a system for optimizing a physical system according to an embodiment.

FIG. 4 is a simplified block diagram of a computer-based system 440 that may be used to optimize the CAD model (or similar 3D solid model) of a physical system and working simulation thereof (e.g., in CAD/CAE systems) according to an embodiment of the present invention. The system 440 comprises a bus 445. The bus 445 serves as an interconnect between the various components of the system 440. Connected to the bus 445 is an input/output device interface 448 for connecting various input and output devices such as a keyboard, mouse, display, speakers, etc. to the system 440. A central processing unit (CPU) 442 is connected to the bus 445 and provides for the execution of computer instructions. Memory 447 provides volatile storage for data used for carrying out computer instructions. Storage 446 provides non-volatile storage for software instructions, such as an operating system (not shown). The system 440 also comprises a network interface 441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 440, or a computer network environment such as the computer environment 550, described herein below in relation to FIG. 5. The computer system 440 may be transformed into the machines that execute the methods (e.g. 220, 330) described herein, for example, by loading software instructions into either memory 447 or non-volatile storage 446 for execution by the CPU 442. One of ordinary skill in the art should further understand that the system 440 and its various components may be configured to carry out any embodiments of the present invention described herein. Further, the system 440 may implement the various embodiments described herein utilizing any combination of hardware, software, and firmware modules operatively coupled, internally, or externally, to the system 440.

Figure 5:
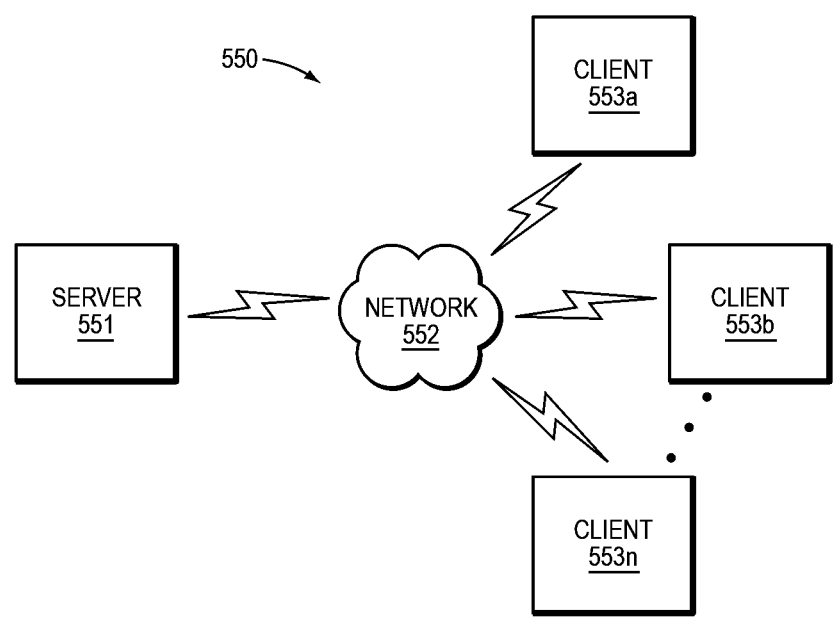
FIG. 5 is a simplified block diagram of a computer network environment in which embodiments of the present invention may be implemented.

FIG. 5 illustrates a computer network environment 550 in which an embodiment of the present invention may be implemented. In the computer network environment 550, the server 551 is linked through the communications network 552 to the clients 553a-n. The environment 550 may be used to allow the clients 553a-n, alone or in combination with the server 551, to execute any of the methods (e.g., 220, 330) described herein.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of simulating a real world physical system, the method comprising:
    defining, in a memory of a processor, a model comprising a plurality of design variables, the defined model representing a real-world physical system where behavior of the model is given by an equation stored in the memory;
    imbedding sensitivity calculations for at least some of the plurality of design variables inside a solver of at least one linear complementarity problem (LCP) representing one or more constraints;
    using the equation, iteratively optimizing the model with respect to a given one of the plurality of design variables by the processor simultaneously solving for equilibrium of the model using linear complementarity problems (LCP) and design response sensitivity of the given one of the plurality of design variables for the equilibrium of the model in a given optimization iteration using the LCP; and
    applying the optimized model to a simulation of the real-world physical system.

2. The method of claim 1 wherein the iteratively optimizing includes optimizing the behavior of the model having an element in contact with one or more surface.

3. The method of claim 2 wherein the behavior is nonlinear.

4. The method of claim 3 where the nonlinear behavior of the model includes small sliding contact constraints which can be modeled by a linear complementarity problem (LCP).

5. The method of claim 1 wherein the design variable is at least one of: a thickness, a width, a radius, a composite material angle, a sizing variable, a material interpolation variable for topology, a shape variable, and a bead variable.

6. The method of claim 1 wherein iteratively optimizing the model optimizes at least one model response, the at least one model response being of: a structural, a computational fluid dynamics (CFD), a thermo-mechanical, an electro-mechanical, an electromagnetic, an acoustic, and a fluid-structural response of the model.

7. The method of claim 1 wherein the model is iteratively optimized with respect to a plurality of the design variables.

8. A computer system for simulating a physical system, the system comprising:
    a processor; and
    a memory with computer code instructions stored thereon, the processor and the memory, with the computer code instructions thereon, being configured to cause the system to:
    define, in the memory, a model comprising a plurality of design variables, the defined model representing a real-world physical system where behavior of the model is given by an equation stored in the memory;
    imbed sensitivity calculations for at least some of the plurality of design variables inside a solver of at least one linear complementarity problem (LCP) representing one or more constraints;
    using the equation, iteratively optimize the model with respect to a given one of the plurality of design variables by the processor simultaneously solving for equilibrium of the model using linear complementarity problems (LCP) and design response sensitivity of the given one of the plurality of design variables for the equilibrium of the model in a given optimization iteration using the LCP; and
    apply the optimized model to a simulation of the real-world physical system.

9. The system of claim 8 wherein the iteratively optimizing includes optimizing the behavior of the model having an element in contact with one or more surface.

10. The system of claim 9 wherein the behavior is nonlinear.

11. The system of claim 10 wherein the nonlinear behavior includes small sliding contact constraints which can be modeled by a linear complementarity problem (LCP).

12. The system of claim 8 wherein the design variable is at least one of: a thickness, a width, a radius, a composite material angle, a sizing variable, a material interpolation variable for topology, a shape variable, and a bead variable.

13. The system of claim 8 wherein iteratively optimizing the model optimizes at least one model response of: a structural, a computational fluid dynamics (CFD), a thermo-mechanical, an electro-mechanical, an electromagnetic, an acoustic, and a fluid-structural response of the model.

14. The system of claim 8 where the model is iteratively optimized with respect to a plurality of the design variables.

15. A computer program product for simulating a physical system, the computer program product executed by a server in communication across a network with one or more clients and comprising:
- a computer readable medium, the computer readable medium comprising program instructions which, when executed by a processor, causes the processor to:
- define, in memory of the processor, a model comprising a plurality of design variables, the defined model representing a real-world physical system where behavior of the model is given by an equation stored in the memory;
- imbed sensitivity calculations for at least some of the plurality of design variables inside a solver of at least one linear complementarity problem (LCP) representing one or more constraints;
- using the equation, iteratively optimize the model with respect to a given one of the plurality of design variables by the processor simultaneously solving for equilibrium of the model using linear complementarity problems (LCP) and design response sensitivity of the given one of the plurality of design variables for the equilibrium of the model in a given optimization iteration using the LCP; and
- apply the optimized model to a simulation of the real-world physical system.

* * * * *